United States Patent Office 3,341,322
Patented Sept. 12, 1967

3,341,322
REDUCTION OF OXIDIC IRON ORES
George William Bailey, Baton Rouge, La., assignor to Esso Research and Engineering Company, a corporation of Delaware
No Drawing. Filed Feb. 25, 1965, Ser. No. 435,345
8 Claims. (Cl. 75—26)

The invention relates to the production of sponge iron by reduction of oxidic iron ores by contact with reducing gases. In particular, it relates to an improved iron ore reduction process wherein fluidized iron ores are metallized by direct contact with hydrogen, carbon monoxide, or mixtures of these and other gases.

The production of sponge iron by reduction of oxidic iron ores, i.e., ores containing or consisting essentially of oxides of iron, in beds fluidized by upwardly flowing gases, at temperatures ranging generally from about 1000° F. to about 1800° F., is well known to the art. Moreover, such processes wherein the fluidized beds are staged as separate reduction zones, and the zones operated at the same or different elevated temperatures generally within this given range is also known.

In a typical staged fluidized iron ore reduction process, iron oxides are, e.g., provided: in a first fluidized bed wherein the oxides are reduced from the ferric state to magnetic oxide of iron; in a second fluidized bed wherein magnetic oxide of iron is reduced to ferrous oxide; and in a third zone wherein ferrous oxide is reduced to metallic iron. The separate stages may be operated at the same or different elevated temperatures, and one or a plurality of ferric reduction zones or ferrous reduction zones may be provided. A burning zone wherein the reducing gas, e.g., hydrogen, is burned with an oxygen-containing gas, e.g., air, may be provided or may be combined with a ferric reduction zone to provide heat for the reaction.

In all such processes it is desired to have sufficiently high temperature to achieve maximum reduction, and to achieve same smoothly and efficiently. One would expect to achieve maximum reduction by increasing the temperature of the reaction, and for the reaction to proceed at a faster rate with increasing temperature. However, high temperatures can produce bogging or, if the temperature becomes sufficiently high, sintering of the ore.

Bogging is a phenomenon manifested by a "stickiness" occurring at the surfaces of the individual solids iron ore particles. It is postulated, and fairly well supported, that the surfaces of the individual ore particles become covered, in whole or in part dependent on temperature, with crystalline forms of iron. These crystalline forms, microscopic in character, often take on the appearance of nodules, projections, or "whiskers" extending outwardly from the individual particles. Because of these projections, or reactive spots, the particles tend to attach upon contact of one particle with another to form "microwelds" so that individual iron ore particles cling together to form aggregates or agglomerates. Such phenomenon is not unlike sintering of the particles in its effect, but differs from sintering inasmuch as the latter is caused by an actual and more widespread melting of the reduced iron upon the surfaces of the particles, this causing the individual particles to cling and weld together over wider junctions to also produce agglomeration.

Bogging, then, is a very undesirable phenomenon and the tendency of an ore to bog increases with increasing temperature, especially as the degree of metallization increases. High temperatures ranging just below that which will produce sintering—i.e., about 1800° F.—are desired, however, inasmuch as more efficient reduction and faster rate of reaction are achieved. This, then, presents a dilemma for, on the one hand, the higher the temperature the more acute the tendency toward bogging and, on the other, the lower the temperature the less the efficiency of the process. With certain ores, e.g., Carol Lake ore, the tendency to bog at elevated temperatures is especially severe, and for this reason it is difficult to treat this and some other ores in a fluidized iron ore reduction process.

It has been heretofore discovered by my colleagues, however, that certain finely divided compounds can be added to the particulate iron ore to inhibit this tendency of the ore to bog. It was thus found that certain oxides—viz., the oxides of Group II-A, IV-B and VI-B metals—or carbonates, since these form oxides in situ, can be added in the form of finely divided dry powders to the ore. Fluidized beds containing ores to which such compounds have been added, even ferrous reduction beds, will not bog even when the temperature is raised above that which would normally induce bogging. A process containing such additives can be operated smoothly and efficiently. The reaction resultant from the use of the additives in some way, it was speculated, poisoned or otherwise altered the active sites from which extended the nodular growths observed on the surface of the individual iron ore particles of a bogged ore. The additives for whatever reason lessened or inhibited the normal tendency of the nodules of the particles to bridge, weld, or stick together on contact.

Further improvement of the process, however, is very desirable and the primary objective of the present invention is, therefore, an even more effective solution of the problem of bogging. In particular, its objective is to provide the art with a simplified, new and novel fluidized iron ore reduction process wherein bogging is inhibited and, in some cases, completely eliminated so that more elevated temperatures can be used and the process operated more effectively for longer periods. A further object is to provide such process wherein significant amounts of sulfur can be eliminated from iron ores and product quality improved. A specific object is to provide an improved process wherein the tendency toward bogging is inhibited or eliminated in the several stages, particularly in the ferrous reduction stage, or stages, of a fluidized iron ore reduction process wherein oxidic iron ores are treated with a reducing gas, or gases, to successively reduce the iron oxides to lower stages of oxidation; and finally to metallic iron. An even more specific object relates to such process providing a series of staged reaction zones wherein a significant portion of hydrogen is used as the reducing gas, and especially wherein hydrogen is burned in direct contact with the iron ore.

These and other objects are achieved in accordance with the present invention which contemplates forming liquid-solids systems, i.e., slurries, by dispersing novel classes of agents or additives in liquid, which systems can be added to, incorporated, or otherwise mixed with fluidized oxidic iron ore in a reduction process, even in minor or minute concentrations, to inhibit or prevent bogging of the particulate ore.

The present invention contemplates, in its preferred embodiments, wetting or admixing finely divided oxides and carbonates, or mixtures thereof, of Groups II, III-A, IV-B and VI-B metals of the Periodic Chart of the Elements with liquid, wetting the ore with the liquid-solids system, and then feeding such ore to a fluidized iron ore reduction process.

Very finely ground oxides and carbonates, or mixtures thereof, particularly the oxides and carbonates of Groups II-A, IV-B and VI-B metals, even though generally insoluble, can be physically dispersed in liquid to form slurries, or liquid-solid suspensions, which systems can be physically admixed with or otherwise incorporated with the finely divided iron ore. Slurries of given particle size distribution of oxides, or carbonates, are far more effective than the use of the dry powders per se. The reason for this phenomenon is not fully understood.

It is believed, however, that slurries of the oxides of these metals provide far better dispersion of the oxide particles upon the surfaces of the iron ore particles and that, at the reaction temperatures, these oxides complex with the silica upon the surface of the iron ore solids particles with which it is in contact to form non-sticky, glassy silicates. Such high degree of dispersion, however, appears only possible upon sufficiently wetting the oxide particles to break the van der Waals or other forces which cause the individual oxide particles to cling together in clusters or aggregates. Upon dispersement, the smaller particles become attached upon the surfaces of the iron ore and remain even after drying. The degree of dispersement possible by such wetting technique will be appreciated when it is realized, e.g., that a cube of finely powdered oxide measuring only 20 microns on each edge broken apart by slurrying to particles ranging from 0.8 to about 1.5 microns provides approximately eight thousand particles. The dispersement of the oxide particles is thus greatly increased over mere mechanical mixing and because of the more complete covering of the iron ore particles, the surface of the ore is effectively blanketed so that the nodules cannot form.

The most preferred method of practicing the present invention is to disperse, preferably in water, compounds of the Groups II–A, IV–B and VI–B metals of the Periodic Chart of the Elements and then to contact, mix, wet, spray, or otherwise impregnate the finely divided iron ore with the slurry and then feed the ore into the fluidized iron ore reduction process.

The oxides and carbonates of the Group II–B and III–A metals can also be dispersed in a liquid to form slurries or liquid-solids suspensions which can then be admixed or otherwise incorporated with the finely divided iron ore to be fluidized and reduced. That oxides of the metals of Groups II–B and III–A are effective is particularly surprising inasmuch as finely divided dry powders of these compounds are generally unsuitable. Slurries of the oxides and carbonates of calcium, titanium, zirconium, chromium and molybdenum, however are the most preferred and the oxides and carbonates of magnesium are even more highly effective.

Suitable dispersing liquids include all of the more common industrial solvents such as acetal solvents, e.g., acetone; alcohols; perchloroethylene, methyl chloroform, n-amyl chloride; aromatic solvents, e.g., benzene, toluene, xylene; glycols, e.g., dibutyl glycol, ethers, e.g., dichloro-iso-propyl ether, dioxane; hydrocarbons, e.g., n-hexane, and the like. Such solvents are generally removed from the ore prior to its introduction to the iron ore reduction process. Water, however, has been found particularly effective and is preferred.

Where slurries are formed, the particles dispersed should be of size less than about 14 mesh (Tyler scale). Preferably, however, the particles should range from about 48 mesh (297 microns) and finer. More preferably, the particles should range from about 325 mesh (44 microns) and finer. Whatever the size of the particles originally added, however, the particles are further dispersed upon wetting with liquid. Generally after slurrying, most of the particles range in size from about 0.2 to about 20 microns in diameter. Often the average diameter is no more than from about 0.8 to about 1.5 and may average about one micron.

The amount of liquid used to form the slurry must be sufficient to thoroughly wet the added compounds and even to form a distinct liquid phase upon settling. Sufficient liquid thus must be used to break up the particle aggregates and generally a colloidal suspension of the oxides and carbonates in liquid is formed. Generally, it is preferable to employ at least about twenty-five percent of the liquid, based on the volume of the oxides or carbonates slurried.

In a fluidized iron ore reduction process, especially when operated at the higher temperatures, it is known that carbonates thermally decompose to oxides, and it has been heretofore observed that process operation is generally at least slightly improved after the conversion has taken place. The effect is even more marked in the use of the carbonates of metals which form the very highly effective oxides. In any event, it is aparent that the addition of slurries of any compound which will provide the oxide in situ will provide the desired benefits. Hence, the addition of slurries of such compounds is within the scope of the present invention.

In the use of such slurries, even where water is used, it is generally preferred to dry the ore which has been contacted therewith prior to introduction of the ore into the fluidized iron ore reduction process. This is desirable particularly prior to introduction of the ore into the lower oxidized stages of reduction to prevent lessening of the reducing power of the gas. Moreover, drying facilitates the handling of the ore. Where liquids other than water are used, drying may be essential. A simple technique for impregnating the ore with slurry is to spray the finely divided ore very thoroughly therewith and then to dry the wetted ore in an oven at a temperature, or at a combination of temperature and pressure, which will drive off the liquid. The amount of slurry to be used is not generally critical but enough must be used to thoroughly wet the ore, and also to provide a sufficient amount of additive to the ore. Preferably, however, a sufficient amount of the slurry is added to form a distinct liquid phase upon settling.

It is generally desirable to employ concentrations of slurries which will provide additives ranging at least from about 0.1 to about 5.0 percent of the oxide, based on the weight of the iron ore feed. Greater concentrations can be used if desired; but, except in the instance of very stubborn ores, such amounts of additives are not required. In most instances it is found suitable to employ concentrations ranging from about 0.1 to about 1.5 percent of the additive, and even more preferably from 0.5 to 1 percent, based on the weight of iron ore.

The following nonlimiting examples and pertinent demonstrations bring out the more salient features and provide a better understanding of the invention.

A large quantity of raw Carol Lake ore is pulverized in an impact mill to particle size ranging from about 75 to 210 microns (65–200 mesh), and divided into several like portions. This ore is one well known as possessing a severe tendency to bog.

A portion of the ore is charged into a fluidized iron ore reactor or reduction process wherein is provided a series of four staged fluidized zones, two ferric reduction zones and two ferrous reduction zones. The ore is fluidized by an upwardly flowing gas initially sixty percent hydrogen and forty percent nitrogen. The gas flows from a zone containing an iron ore at a lower level of oxidation to the next higher level of oxidation, i.e., from the bottom to the top of the reactor. In the top ferric zone the partially oxidized gas is burned with air to provide heat to the various reduction stages. The reduced ore moves from the top to the bottom of the reactor and from one stage of reduction to the next. The ferric reduction stages, wherein ferric oxides are reduced essentially to magnetic oxides of iron, are operated at 1300° F. as are the ferrous reduction stages wherein the ferrous oxide is reduced, in the final stage, to provide 94 percent metallization.

Pursuant to operating at such conditions, the ferrous reduction beds showed signs of bogging within about ten minutes and are severely and totally bogged in only twenty minutes of continuous operation.

*Example 1*

The foregoing demonstration is repeated in precise detail employing a second portion of the ore except in this instance a sufficient amount of magnesium oxide, ground to a particle size distribution of about 150 to about 400 mesh (Tyler scale) is slurried with water, and a sufficient amount of the slurry thoroughly mixed with the ore to provide one percent of the magnesium oxide, based on the weight of the ore. The total fluids-solids system is then dried in an oven at 220° F. The dry ore is then continuously charged into the top or first burning ferric reduction zone. At the end of several hours, when the test is arbitrarily terminated, there is not the slightest evidence of bogging or of any tendency toward bogging. The beds appeared normal and the process functioned normally in every way. Moreover, the iron ore product is improved to the extent that, after briquetting, it is ready for charging to a blast furnace without any necessity of adding a fluxing agent.

Example 2

When Example 1 is repeated with another portion of ore at a temperature of 1400° F. and dolomitic lime consisting essentially of a fifty-fifty weight percent mixture of the oxides of calcium and magnesium is dispersed in water and the slurry added to the ore in one percent concentration, based on the weight of the ore, and fed into the top bed without drying, there is yet no bogging or tendency toward bogging at the end of several hours, when the test is arbitrarily terminated.

Example 3

When Example 2 is repeated and titanium oxide is substituted for dolomite in the process, there is no evidence of bogging at the end of several hours.

Comparative data are set forth hereafter to more effectively contrast the advantages of the present novel slurries in inhibiting bogging. Carol Lake ore is pulverized as in Example 1 and the ore divided into several portions. To certain of the ore portions is added slurries of various compounds to compare their effectiveness. The separately treated ore portions are reduced with a 60:40 gaseous mixture of hydrogen:nitrogen in a single stage unit, the gas entering the unit at a space velocity of 2.5 feet per second.

In the examples and demonstrations immediately following, magnesium oxide (MgO) is slurried in water and the slurry used in varying amounts to thoroughly mix with and wet the ore. The ore portions are then dried at 220° F. and the treated ore charged to the fluidized iron ore reduction unit. The amount of slurry provided to wet the ore is sufficient to provide certain defined concentrations of the magnesium oxide, based on the weight of the ore, and the concentrations provided are given in the table below. The table also shows ore similarly reduced except that no additive is provided to the ore prior to reduction. In addition, there is shown results of a run wherein only dry magnesium oxide powder is added. The time required from "time zero" to the time required for a bog is given for each run.

| Example | Additive | Time to Bog, Minutes |
|---|---|---|
|  | None | 13 |
| 4 | 0.1% dry MgO powder (65 to 200 mesh) | 25 |
|  | 0.1% coarse MgO (Commercial Grade; 65 to 200 mesh colloidal suspension in water). | 180 |
| 5 | 1% MgO (65 to 200 mesh; colloidal suspension in water). | *330+ |

*No bog at end of period shown when test is arbitrarily terminated.

The foregoing data thus clearly demonstrate the advantages of a slurry of magnesium oxide as contrasted with the use of dry magnesium oxide powder. Thus, the identical magnesium oxide powder suspended in water and used under identical conditions is approximately fourteen hundred percent more effective than the use of the dry powder for treating the ore.

Example 6

When the foregoing test is repeated except that the oxide of chromium is dispersed in water in concentration sufficient to provide one percent of solids, based on the weight of the ore, dried, and charged to the process, excellent results are again obtained. The run is conducted for a period of several hours after which time the run is arbitrarily terminated. At the completion of the run, there is not the slightest evidence of bogging or of a tendency to bog.

Examination of the iron ore at the termination of the run does not reveal the presence of nodules on any of the reduced particles. It is believed that the oxide complexes with siliceous materials at or on the surface of the particles, this preventing the growth of crystalline iron deposits.

Example 7

When the foregoing run is repeated except that cadmium oxide is dispersed in ethyl alcohol, dried, and then charged into the process, good results are again obtained.

After termination of the run, an examination of the reduced iron particles does not reveal the presence of iron nodules on the surface of the particles.

Example 8

When the foregoing run is repeated using a slurry of aluminum oxide in water, bogging is again inhibited for a considerable period of time.

In contrast, however, a fine mixture of alumina powder has little or no effect in inhibiting bogging.

In further tests a finely ground Cerro Bolivar ore is divided into portions. Finely divided oxides are then slurried with water and the slurries then added by spraying or mixing with the portions of ore. The ore is then dried in a circulating oven at 220° F. Runs are conducted at 1600° F. For purposes of comparison, a run is also made wherein none of the slurry is mixed or sprayed on the ore.

While Cerro Bolivar ore is not as prone to bogging as Carol Lake ore, runs conducted at 1600° F. nonetheless represent harsh conditions.

The results of the runs are given in the following table:

| Example | Additive | Time to Bog, Minutes |
|---|---|---|
|  | None | 18 |
| 9 | 0.5% MgO (slurry spray) | 158 |
| 10 | 0.5% MgO in water slurry | *285+ |
| 11 | 0.5% aluminum oxide in water slurry | 190 |

*No bog at end of period when test is arbitrarily terminated.

The addition of a magnesium oxide slurry as a spray without a more thorough mixing with the ore, it will be noted, is not as effective as the well mixed slurry. This indicates that good dispersion of the inhibitor slurry is desirable for most effective use.

The slurries of this invention, including especially those preferred classes, are preferably contacted with the finely divided ore, dried and then charged directly to the ferrous reduction zone or bed wherein the tendency to bog is the most severe.

In certain circumstances, however, it may be desirable to add all or a portion of the so-treated and dried additives to the ferric zone or bed, or to a burning bed, which precedes other beds or zones, and wherein temperatures can range from about 1000° F. to about 1800° F. A burning bed is one wherein a portion of the hydrogen is burned with an oxygen-containing gas, e.g., air, so that the heats of combustion are imparted to the fluidized iron ore bed. The combustion can be under oxidizing or reducing conditions, i.e., in an excess or deficiency of the oxygen-containing gas, so that the oxidic iron ore will be oxidized or reduced. Where the bed is operated under reducing conditions, it constitutes also a ferric reduction zone and can be succeeded by an additional ferric reduction zone, or zones, and by a ferrous reduction zone, or zones. In certain circumstances, e.g., wherein the ore contains undesirable sulfur or sulfides, it is preferred to operate the burning bed under oxidizing conditions to remove sulfur. The burning bed in such circumstances is followed by ferric and ferrous reduction zones, and at least some of the additive carries through the process to the ferrous reduction zone, or zones, wherein bogging is the most severe.

Moreover, certain of the preferred class of additives provides additional benefits inasmuch as they remain within the sponge iron product to act as a fluxing agent in the final reduction, as in a blast furnace for making steel. This is indeed a fortuitous advantage for fluxes generally have not only proven ineffective as additives in the present process, but have even proven detrimental inasmuch as they not only failed to decrease the bogging tendency but promoted bogging. In any event, however, if desired the additives can be removed by beneficiation after the reduction. A further advantage of this invention is that decrepitation, or the tendency of the ore to produce fines, is lessened by the presence of certain of the additives, and often scale and other harmful deposits are eliminated.

It is apparent that certain modifications and changes can be made in the present process without departing the spirit and scope of the invention. The key and novel feature of the invention is the use of slurries containing small and minor portions of various additives, or precursors thereof, which can be directly added to, premixed, or otherwise physically admixed with oxidic iron ores which are subjected to reduction in a fluidized process.

Having described the invention, what is claimed is:

1. In a process for the production of sponge iron by the direct reduction of particulate oxidic iron ores in the sequence including a plurality of staged fluidized reduction zones, the combination comprising
    dispersing, in liquid, additive compounds of particle size 14 mesh and finer which are selected from oxides and carbonates of the Group II, IIIA, IVB, and VIB of the Periodic Chart of the Elements, to form a slurry.
    wetting and admixing the oxidic iron ore with the slurry to provide concentrations of additive ranging from about 0.1 to about 5%, based on the weight of the feed,
    charging the wetted ore into the initial stage of the sequence, fluidizing and drying the oxidic iron ore by direct contact with upwardly flowing hydrogen-containing combustion gases generated in a reduction zone wherein ferric oxide is reduced to a lower state of oxidation and hydrogen is burned with an oxygen-containing gas to provide heat for the process and to maintain an operating temperature of from about 1300° F. to about 1600° F. in said ferric reduction zone, and
    in a plurality of ferrous reduction zones operating at a temperature ranging from about 1300° F. to about 1500° F. wherein ferrous oxide is reduced to metallic iron.

2. The process of claim 1 wherein the liquid within which the additive compound is dispersed is a hydrocarbon.

3. In a process for the production of sponge iron by direct reduction of particulate oxidic iron ores in a plurality of staged fluidized reduction zones including the combination comprising dispersing, in water, additive compounds of particle size 14 mesh and finer which are selected from oxides and carbonates of the Group II, III-A, IV-B and VI-B of the Periodic Chart of the Elements, to form a slurry, wetting and admixing the oxidic iron ore with the slurry to provide concentrations of additive ranging from about 0.1 to about 5 percent, based on the weight of the feed, and drying and fluidizing the oxidic iron ore by direct contact with upwardly flowing hydrogen-containing combustion gases generated in a first ferric reduction zone wherein ferric oxide is reduced to a lower state of oxidation and hydrogen is burned with an oxygen-containing gas to provide heat for the process and to maintain an operating temperature of from about 1300° F. to about 1600° F. in the ferric reduction zone, and in a plurality of ferrous reduction zones operated at a temperature ranging from about 1300° F. to about 1500° F. wherein ferrous oxide is reduced to metallic iron.

4. The process of claim 3 wherein the dispersed additive compound is initially of particle size ranging from essentially about 48 mesh and finer.

5. The process of claim 3 wherein the dispersed additive compound consists essentially of magnesium oxide.

6. In a process for the production of sponge iron by direct reduction of particulate oxidic iron ores in a plurality of staged fluidized reduction zones including the combination comprising dispersing in water compounds of particle size 14 mesh and finer which are selected from oxides and carbonates of the Group II-A, IV-B and VI-B metals, of the Periodic Chart of the Elements, to form a slurry, wetting and admixing the oxidic ore with the slurry to provide concentrations of additive ranging from about 0.1 to about 1.5 percent, based on the weight of the feed, and drying and fluidizing the iron oxides solids particles with upwardly flowing hydrogen-containing gases generated in a first ferric reduction zone wherein ferric oxide is reduced to a lower state of oxidation and hydrogen is burned with an oxygen-containing gases to provide heat for the process and to maintain an operating temperature of from about 1300° F. to about 1600° F. in the ferric reduction zone and in a plurality of ferrous reduction zones operated at from about 1300° F. to about 1500° F. wherein ferrous oxide is reduced to metallic iron.

7. The process of claim 6 wherein the dispersed additive compound is initially of particle size ranging from essentially about 325 and finer.

8. The process of claim 7 wherein the dispersed additive compound consists essentially of magnesium oxide.

References Cited

UNITED STATES PATENTS

| | | | |
|---|---|---|---|
| 2,758,802 | 8/1956 | Drapeau, et al. | 75—26 |
| 2,831,759 | 4/1958 | Osborn | 75—26 |
| 3,020,149 | 2/1962 | Old et al. | 75—26 |
| 3,062,639 | 11/1962 | Sterling | 75—26 |
| 3,126,276 | 3/1964 | Marshall et al. | 75—26 |

BENJAMIN HENKIN, *Primary Examiner.*